United States Patent [19]

Paton et al.

[11] Patent Number: 4,711,387

[45] Date of Patent: Dec. 8, 1987

[54] METHOD OF PRODUCING PIPES WITH CRACK ARRESTERS

[76] Inventors: Boris E. Paton, ulitsa Chkalova, 41a, kv. 26; Boris I. Medovar, ulitsa Anri Barbjusa, 22/26, kv. 109; Semen M. Biletsky, ulitsa Kopernika, 16b, kv. 24; Vladimir Y. Saenko, Kharkovskoe shosse, 18, kv. 71; Vasiliy I. Us, ulitsa Filatova, 1/22, kv. 9; Alisa I. Krendeleva, prospekt Pravdy, 72a, kv. 185; Jury P. Barvinko, Darnitsky bulvar, 9, kv. 41; Lev B. Medovar, ulitsa Anri Barbjusa, 5b, kv. 62; Nikolai B. Pivovarsky, ulitsa Marshala Yakubovskogo, 7, kv. 30; Nikolai A. Astafiev, ulitsa Prirechnaya, 1a, kv. 96, all of Kiev, U.S.S.R.

[21] Appl. No.: 764,542

[22] PCT Filed: Mar. 21, 1984

[86] PCT No.: PCT/SU84/00016

§ 371 Date: Aug. 12, 1985

§ 102(e) Date: Aug. 12, 1985

[87] PCT Pub. No.: WO85/03114

PCT Pub. Date: Jul. 18, 1985

[30] Foreign Application Priority Data

Jan. 5, 1984 [SU] U.S.S.R. .............................. 3679051

[51] Int. Cl.$^4$ ...................... B23K 20/04; B23K 20/18; B23K 31/06; B21C 37/06

[52] U.S. Cl. ...................................... 228/143; 72/368; 228/184

[58] Field of Search ..................... 72/51, 52, 110, 368, 72/46, 146, 147, 367; 138/141, 142, 143, 171, 172; 228/143, 184, 118

[56] References Cited

U.S. PATENT DOCUMENTS

| | | | |
|---|---|---|---|
| 3,755,883 | 9/1973 | Shimizu et al. | 228/143 |
| 3,859,830 | 1/1975 | Jeuken et al. | 72/110 X |
| 4,095,594 | 6/1978 | Paton et al. | 228/143 |
| 4,383,556 | 5/1983 | Paton et al. | 228/184 X |

FOREIGN PATENT DOCUMENTS 506485  3/1976  U.S.S.R. .

OTHER PUBLICATIONS

V. K. Korol et al., "Fundamentals of Processes for Producing Multi-Layer Metals," 1970, pp. 36, 38-41, 54 and English translation.

*Primary Examiner*—E. Michael Combs
*Attorney, Agent, or Firm*—Lilling & Greenspan

[57] ABSTRACT

Disclosed is a method of producing crack arrester consisting in that a hollow cylindrical blank (1) with a multi-layer wall and a discontinuity (2) provided at least in one of the layers is made so that the diameter and wall thickness thereof are smaller and greater, respectively, than the specified final dimensions of the crack arrester (5) and the blank (1) is then heated and rolled on a ring-rolling mill (4) uniformly over the entire length to the final dimensions of the crack arrester (5) so that the layers fuse to each other in the course of rolling.

1 Claim, 7 Drawing Figures

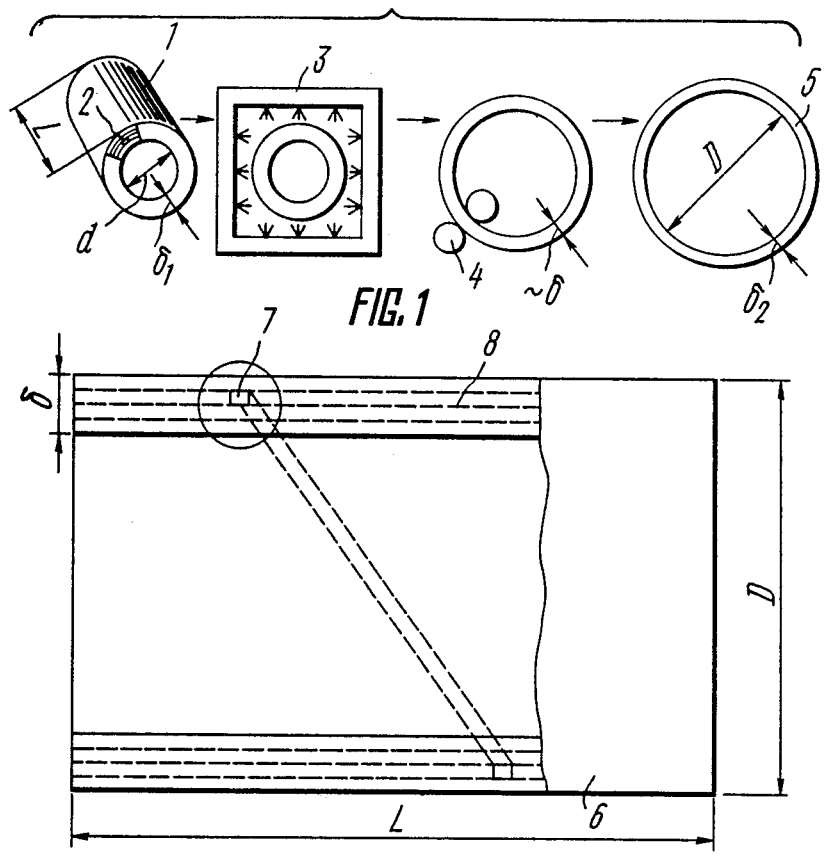
FIG. 1
FIG. 2
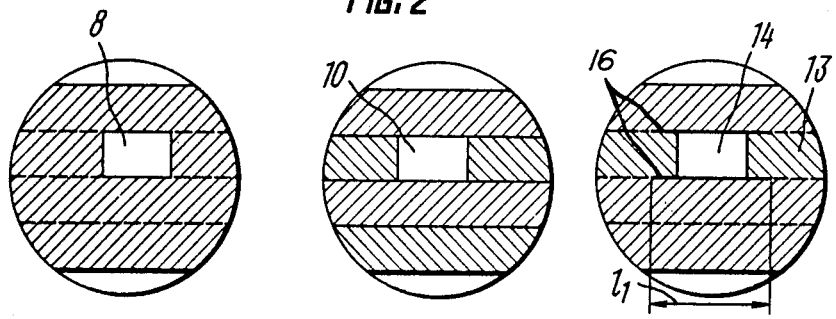
FIG. 3　　　　FIG. 5　　　　FIG. 7

METHOD OF PRODUCING PIPES WITH CRACK ARRESTERS

BACKGROUND OF THE INVENTION

1. Field of the Invention

The present invention relates to methods of manufacturing large-diameter piping and is specifically concerned with a method of producing crack arrester.

2. Description of Related Art

The laying of trunk pipelines, expecially in the Arctic, has given rise to the problem of protecting the piping against longitudinal failures.

With an increase in gas pressure and pipe diameter, the potential energy accumulated in the pipeline greatly increases and the task of limiting the extent of failure appears to be complicated. Studies have shown that ductile failures can be mitigated with a probability of a given order if the toughness of the steel used is increased 1.5-2 times compared with the existing values. However, the rapid structural changes taking place in the wall of a pipe during its failure interfere with the mechanism of plastic deformation and prevent full capitalization of the high toughness of steel achieved at a high price.

It must be also taken into account that the potentiality of steel-casting and plate-rolling plants in producing steel of requisite toughness and strength at an economically-acceptable cost is limited. It appears that under the existing conditions an optimum method of limiting the propagation of longitudinal ductile failures consists in building pipelines of a steel not liable to brittle failure and incorporating thereinto at strategical points crack arresters ensuring that every propagating crack will be stopped within their length.

Generally known are crack arresters in the form of a pipe length of the same diameter as the pipeline and enshrouded with strip or rope. The elastic energy released while the crack propagates is absorbed by the strip or rope with the result that the crack cannot widen, changes its trajectory from rectilinear to a helical one and is stopped eventually.

These crack arresters invite difficulties in laying pipelines and increase the cost of said projects.

Recently a crack arrester for trunk pipelines has been developed (cf. U.S. Pat. No. 4,383,556; Int. Cl.$^3$ F 161 13/02; 1983) which is made in the form of a multi-layer pipe section with a diameter and wall thickness equalling those of the pipeline and is provided with specially shaped slots in inner layers.

The slots at the edges of multi-layer crack arresters pose problems in placing circumferential welds at the site. Multilayer pipe sections display a reduced stiffness which increases difficulties in handling and welding the piping.

Also known is a method of producing multi-layer crack arresters consisting of winding a slotted strip around a pipe section of a diameter and wall thickness equalling those of the pipeline, welding the inner and outer lap joints to each other, and welding solid wall pipe lengths to each end face of the crack arrester at the shop which are intended to facilitate the fitting of the crack arrester to the pipeline at the site (cf. Trudy VII sovmestnogo sovetsko-zapadnogermanskogo simposiuma s knotsernom Mannesman AG po trubam bolshogo diametra; B. E. Paton, S. M. Biletsky, A. A. Rybakov, Yu. P. Barvinko "Truby i gasiteli razrusheniy s mnogosloinoy stenkoy dlya magistralnykh gazoprovodov", Minneftegasstroy Publishers, Moscow, pp. 8-11, 1982).

The solid-wall pipe lengths added to the crack arrester reduce the effect obtained from applying the known method of producing crack arrester.

SUMMARY OF THE INVENTION

It is an object of the invention to provide a method of producing crack arrester which will streamline the welding procedure and improve the weld quality in fitting the crack arrester to the pipeline.

Another object of the invention is to increase the effectiveness of the crack arrester in extreme operating conditions.

The main object of the invention is to provide a method of producing crack arrester which streamlines the welding procedure and improves the weld quality in fitting the crack arrester to the pipeline and which also increases the effectiveness of the crack arrester in extreme operating conditions owing to a changed technique of producing same.

This object is realized by a method of producing crack arrester which consists in fabricating a hollow cylindrical blank with a multi-layer wall and a discontinuity, e.g. a slot, in at least one layer of the wall, the crack arrester blank being provided with a diameter and wall thickness that are smaller and greater, respectively, than the relevant final dimensions of the crack arrester, being heated and rolled on a ring-rolling mill so as to obtain the final dimensions of the crack arrester at any point of the length thereof and cause the layers to fuse to each other.

This technique of manufacturing the blank of a crack arrester enables the layers to fuse to each other and provides for obtaining specified dimensions of the crack arrester.

The fused layers streamline the welding procedure and improve the weld quality in fitting the crack arrester to the pipeline. No solid-wall pipe lengths need be welded to the end faces, for the crack arrester with fused layers behaves during the welding to the pipeline in the same way as a solid-wall component.

To increase the effectiveness of the crack arrester in extreme operating conditions, it is expedient to apply a coating to some of the inside layers within areas located at a distance from the end faces of the blank that will prevent the layers from fusing to each other in the course of rolling the zone of coating.

It is also expedient to apply the coating only within the zone of the discontinuity.

A selective application of the coating only within the zones of discontinuity permits leaving the multi-layer structure intact elsewhere with the result that the blank will practically retain its original stiffness after the rolling.

BRIEF DESCRIPTION OF THE DRAWINGS

The invention will now be described by way of examples with reference to the accompanying drawings in which:

FIG. 1 illustrates the sequence of events during the process of manufacturing a crack arrester according to the invention;

FIG. 2 illustrates a crack arrester made by the disclosed method wherein the layers in the wall are fused to each other all the way along;

FIG. 3 illustrates a fragment of the wall next to a discontinuity which is encircled in FIG. 2;

FIG. 5 illustrates a fragment of the wall next to a discontinuity which is encircled in FIG. 4;

FIG. 7 illustrates a fragment of the wall next to the discontinuity which is encircled in FIG. 6.

DESCRIPTION OF THE PREFERRED EMBODIMENTS

Figure 4:
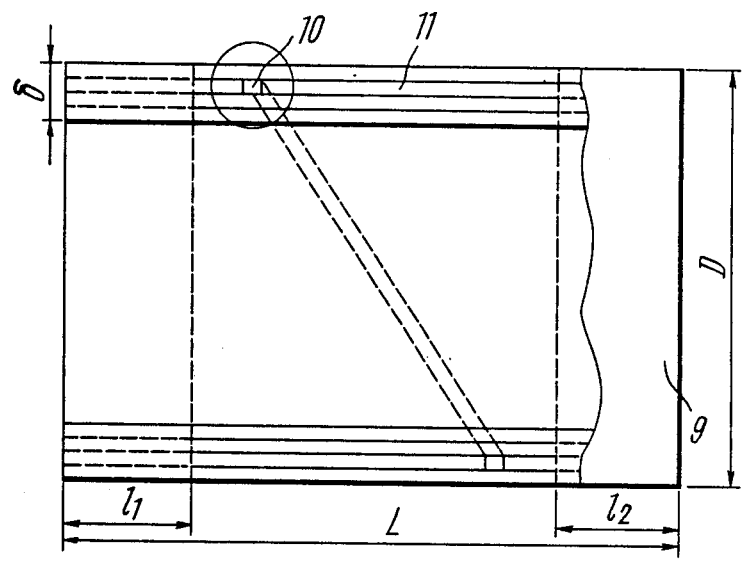
FIG. 4 illustrates a crack arrester made by the disclosed method wherein a coating preventing the layers from fusing to each other is applied within areas located at a distance from the end faces of the crack arrester.

The method of producing crack arresters according to the invention consists in fabricating a hollow cylindrical blank 1 (FIG. 1) with a multi-layer wall and discontinuities 2, e.g. slots, in at least one of the layers. The diameter d of the blank is smaller and the wall thickness $\delta_1$ greater than the relevant final dimensions of the crack arrester.

The blank 1 can be produced in various ways. For example, a steel strip with at least one discontinuity 2 can be wound at right angles so as to obtain the blank 1 with a given diameter and wall thickness. The ends of the strip are welded to the blank 1 by inside and outside lap welds.

The blank 1 can also be made from a steel sandwich or a stack of sheets with discontinuities 2 in several layers or one layer at least. Any known technique (rolling or forge-rolling) can be used to shape the sandwich into the hollow cylindrical blank 1 with one or more longitudinal welds.

Alternatively, the blank 1 of given dimensions with a multi-layer wall can be assembled from shells of progressively decreasing diameters and with discontinuities 2 in at least one of the shells which are then successively inserted into each other.

The blank 1 thus obtained is heated in a soaking-pit furnace 3 and rolled on a ring-rolling mill 4 to the specified final dimensions (diameter D and wall thickness $\delta_2$) of the crack arrester 5.

If conditions warrant it, a coat preventing layers from fusing to each other during the rolling is applied selectively to some areas of one layer or more than one layer of the blank 1. The areas which are coated are located at a distance from the end faces of the blank 1. In those cases when the wall thickness of the crack arrester 5 is comparatively small, it is practical to apply the coating only next to a discontinuity 2.

The discontinuity 2 can be a slot produced by any known technique such as plasma cutting, cutting with a grinding wheel, milling, etc. Sawing, drilling and chiseling out can be used to that end as well. The edges of the slots extend at right angles to the direction of rolling so that the discontinuities 2 are not affected by the rolling.

It is known that a success in stopping a crack in a pipeline by altering the direction of propagation thereof depends on the ratio of the velocity of longitudinal propagation and that of the widening of the crack immediately behind the tip of the crack. The direction of crack propagation can be changed by providing barriers in the path of the crack. They drastically reduce the longitudinal rate of propagation with the result that the crack widens all of a sudden and continues its progress in a helical path. A suitable barrier in this case is a discontinuity 2. As soon as a crack arrives at a discontinuity 2, the state of stress and strain at the tip of the crack suddenly vanishes and, since no conditions for the initiation of a new crack exist at the opposite border of the barrier, the failure does not go further.

A slot appears to be the simplest form of discontinuity 2 in the wall. However, a through slot cannot be used in some structures (e.g. gas pipelines) due to operational reasons.

The development of multi-layer piping for gas pipelines at the Paton Institute of Electrical Welding and the departure from the traditional concept of the pipe as a solid-wall structure have paved the way to suggesting a barrier of a new type, i.e. in the form of a sandwich with through slots in some of the layers which run at an angle to the probable direction of crack propagation.

A theoretical study has shown that the discontinuities 2 provided in some of the layers only can create conditions for stopping a crack in the rest of layers. The function of a discontinuity 2 (e.g. a slot) is a two-fold one in this case. On the one hand, it stops the crack in the layer that has been slotted. On the other hand, it provides a "shroud" in the form of an intact portion of the wall behind the slot for the slotless layer that are located above and below the layer with the discontinuity 2.

The number and location of discontinuities are selected so as to ensure that the static strength of the crack arrester and that of the pipe sustaining an internal pressure are the same. Provision of a structure that causes a crack to change the direction of propagation from rectilinear to a helical one is another factor deciding the number and location of discontinuities. A crack meeting a barrier in the form of a slot (i.e. a discontinuity 2) sharply slows down the rate of progress. This brings about a rapid widening of the crack and causes same to alter the path of propagation from rectilinear to helical. With the widening of the crack, whole layers sustain failure along the edges of the shroud consisting of the intact layers located beyond the slot.

Consider a few examples which describe the disclosed method of producing a crack arrester 5 (FIG. 1).

EXAMPLE 1

A hollow blank 1 of a crack arrester 6 (FIG. 2) intended for operation in conjunction with a trunk gas pipeline of a diameter D=1420 mm (FIG. 1) and a thickness of the wall 8 $\delta$=16.5 mm (FIG. 2) capable of withstanding a pressure of 7.35 MPa was made by winding at right angles, for example, a low alloy hot rolled strip steel with a thickness of 7 mm and a length L=750 mm. The hollow cylindrical blank 1 (FIG. 1) with a multi-layer wall thus obtained had an inside diameter d=630 mm and an aggregate wall thickness $\delta_2$=28 mm (4×7 mm). Slots 8 (FIGS. 2, 3) were made all the way along the circumferential length of the second layer before winding the strip, using any known technique (e.g. plasma cutting). The lap joins were fastened by automatic submerged arc welding. The blank 1 (FIG. 1) was heated to 1100°-1250° C., for example, in a gas-fired furnace and rolled on a ring-rolling mill 4 to a final diameter D=1420 mm (FIG. 2).

EXAMPLE 2

A crack arrester 9 (FIG. 4) of the same dimensions as in Example 1 was fabricated from four 750 mm long shells with a diameter of 630 mm, 644 mm, 658 mm, and 672 mm. The material of the 630 mm diameter shell was stainless austenitic steel and that of the rest of shells, low-carbon steel. The 658 mm diameter shell was provided with a slot 10 (FIGS. 4, 5) and the shells with the diameter of 658 and 644 mm were given within a length of $L=(l_1+l_2)$ a coat of chromium oxide (FIGS. 4, 5). A blank assembled from the shells fitting into each other with a tight fit was heated up and rolled as in Example 1. The layers forming the wall 11 of the crack arrester 9 (FIG. 4) remained unfused to each other within the length $L-(l_1+l_2)$ but were all fused together at the ends of the crack arrester 9 within the lengths $l_1$ and $l_2$.

EXAMPLE 3

Figure 6:
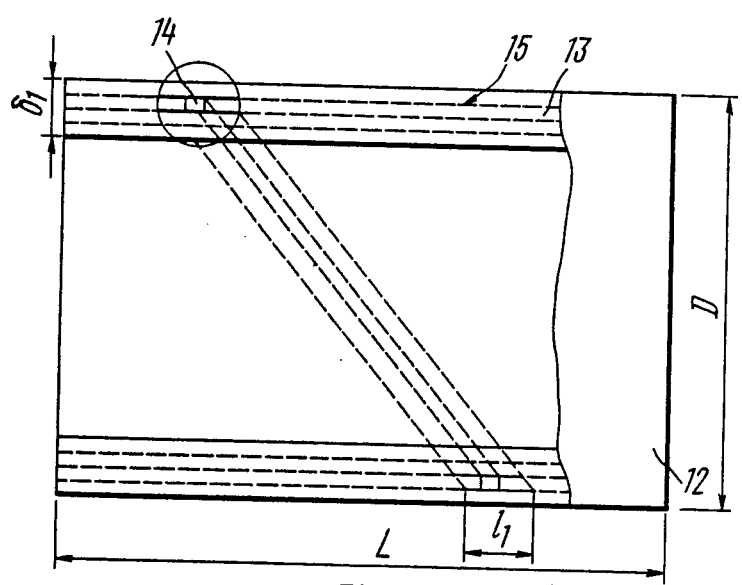
FIG. 6 illustrates a crack arrester made by the disclosed method wherein a coating preventing the layers from fusing to each other is applied next to a discontinuity.

To produce a crack arrester 12 (FIG. 6), a blank with a length of 600 mm and a diameter of 1000 mm was rolled from a low-alloy steel sandwich with a thickness of 24 mm, a width of 600 mm and a length of 3140 mm. A coating consisting of magnesium carbonate and water glass was applied to the second layer 13 (FIG. 7) with a slot 14 within a length $l_1$. The edges of the sandwich were joined together by automatic gas-shielded arc welding. The blank was heated up to 1100°–1250° C. and rolled on a ring-rolling mill to an outside diameter $D=1420$ mm (FIG. 6) and a wall thickness $\delta_1=16.5$ mm. The layers 13 (FIG. 7) of the wall 15 (FIG. 6) of the crack arrester 12 remained unfused within a length $l_1$ at the surfaces 16 next to the slot 14. At the end faces of the crack arrester 12 all layers were fused to each other.

Thus, the crack arresters produced by the disclosed method have each a multi-layer wall with discontinuities in some of the layers which stop the propagation of a crack through the wall within the length of the crack arrester. The layers fused to each other at the ends of the crack arrester streamline the welding procedure and improve the quality of the welds used to fit the crack arrester to the pipeline. No solid-wall pipe lengths need be welded to the crack arrester at the end faces thereof, for the crack arrester with fused layers behaves during the welding to the pipeline in the same way as a solid-wall pipe.

The invention may find wide-spread application as a means of localizing longitudinal failures of trunk gas pipelines and protecting line fittings, bridges, crossovers and compressor stations against failure.

What is claimed is:

1. A method of manufacturing large diameter pipes with crack arresting means therein comprising the steps of fabricating a hollow cylindrical blank with a multi-layered wall and a slot extending through the entire thickness of at least one of the layers, said blank being provided with a diameter and wall thickness that are smaller and greater, respectively, than a final diameter and wall thickness of a completed pipe, applying a fusion-preventing coating to facing surfaces of selected internal layers of said cylindrical blank at least within limited areas adjacent to said slot and spaced from end surfaces of said blank, heating and rolling said multi-layered cylindrical blank on a ring rolling mill to said final diameter and wall thickness, and fusing said layers to each other while preventing the fusion of said coated facing surfaces of said selected internal layers adjacent said slot, thereby forming a multi-layered pipe with increased resistance to crack propagation under extreme operating conditions.

* * * * *